United States Patent
Dou et al.

(10) Patent No.: US 11,643,955 B1
(45) Date of Patent: May 9, 2023

(54) DIESEL EXHAUST FLUID INJECTOR HEATER

(71) Applicant: Deere & Company, Moline, IL (US)

(72) Inventors: Danan Dou, Cedar Falls, IA (US); Derek A. Weiss, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/550,303

(22) Filed: Dec. 14, 2021

(51) Int. Cl.
*F01N 3/20* (2006.01)
*F01N 9/00* (2006.01)
*F01N 3/029* (2006.01)

(52) U.S. Cl.
CPC .......... *F01N 3/206* (2013.01); *F01N 3/2066* (2013.01); *F01N 9/00* (2013.01); *F01N 3/029* (2013.01); *F01N 2240/16* (2013.01); *F01N 2240/20* (2013.01); *F01N 2610/02* (2013.01); *F01N 2610/105* (2013.01); *F01N 2900/1821* (2013.01)

(58) Field of Classification Search
CPC .......... F01N 3/206; F01N 3/2066; F01N 9/00; F01N 3/029; F01N 2240/16; F01N 2240/20; F01N 2610/02; F01N 2610/105; F01N 2900/1821
See application file for complete search history.

(56) References Cited

U.S. PATENT DOCUMENTS

| | | | |
|---|---|---|---|
| 2009/0000605 A1* | 1/2009 | Craig | F01N 3/36 123/549 |
| 2009/0038299 A1* | 2/2009 | Gierszewski | F01N 11/00 60/301 |
| 2022/0178289 A1* | 6/2022 | Capirchia | F01N 3/2828 |
| 2022/0307400 A1* | 9/2022 | Wahlstrom | B01D 53/9477 |

* cited by examiner

*Primary Examiner* — Brandon D Lee
(74) *Attorney, Agent, or Firm* — Tucker Ellis LLP; Evan R. Sotiriou (57) ABSTRACT

One or more techniques and/or systems are disclosed for providing localized heating within an engine exhaust aftertreatment system. The localized heating includes DEF injector nozzle heating with a DEF dispensing system having a DEF fluid supply and a DEF injector fluidly coupled to the DEF fluid supply. The DEF injector includes a DEF injector nozzle. The DEF dispensing system further includes a DEF heater positioned in proximity to the DEF injector nozzle. The DEF heater is configured to locally heat an area surrounding the DEF injector nozzle.

20 Claims, 7 Drawing Sheets

DIESEL EXHAUST FLUID INJECTOR HEATER

BACKGROUND

Diesel exhaust fluid (DEF) is used in selective catalytic reduction (SCR) systems to remove nitrogen oxides (NOx) from engine exhaust. DEF is injected into an engine exhaust stream prior to the SCR catalyst. NOx in the exhaust stream is then converted into nitrogen and water through a chemical reaction. A DEF injector assembly can be used in an engine exhaust aftertreatment system. The DEF injector assembly delivers the DEF to the engine exhaust stream. In vehicles (e.g., tractors) with an engine exhaust aftertreatment system, DEF deposits can form around the injector tip over time. As a result, the DEF injection can be affected, which can affect the mixing with exhaust and effective urea decomposition. The deposit can also result in DEF liquid pooling or dripping onto other components located below the injector. The DEF dripping on the components can cause damage that may compromise the effectiveness for filtration. Preventing the deposit formation and growth at the DEF injector tip can result in more robust operation of the engine exhaust aftertreatment system.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for heating a DEF injector, particularly a DEF injector tip, that prevents deposit formation and growth at the DEF injector tip. For example, the heater generates localized heating at a temperature to prevent, dislodge, and/or disintegrate deposit formation at the DEF injector tip. As such, with the deposit formation and growth mitigated, the engine exhaust aftertreatment system is able to provide more robust operation over time.

In one implementation for providing DEF injector nozzle heating, a DEF dispensing system includes a DEF fluid supply and a DEF injector fluidly coupled to the DEF fluid supply. The DEF injector includes a DEF injector nozzle. The DEF dispensing system further includes a DEF heater positioned in proximity to the DEF injector nozzle. The DEF heater is configured to locally heat an area surrounding the DEF injector nozzle.

In another implementation, a DEF heater includes a body configured to couple to a flange of a DEF mixer and a central opening extending through the body. The central opening is configured to receive therein a DEF injector nozzle of a DEF injector. The body is configured to generate heat to at least one of prevent, dislodge, or disintegrate deposit growth around the DEF injector nozzle.

In yet another implementation, a method for controlling heating at DEF injector nozzle includes configuring a DEF heater to generate heat at the DEF injector nozzle and accessing a heating schedule, the heating schedule stored in a memory. The method further includes controlling the DEF heater to generate heat based on the accessed heating schedule. The heat is of a sufficient temperature to at least one of prevent, dislodge, or disintegrate deposit growth around the DEF injector nozzle.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different applications, such as for different DEF mixer applications and in different exhaust systems. That is, the herein disclosed examples can be implemented in different engine exhaust aftertreatment systems and exhaust systems other than for particular vehicles, such as other than for farm vehicles (e.g., tractors).

Figure 1:
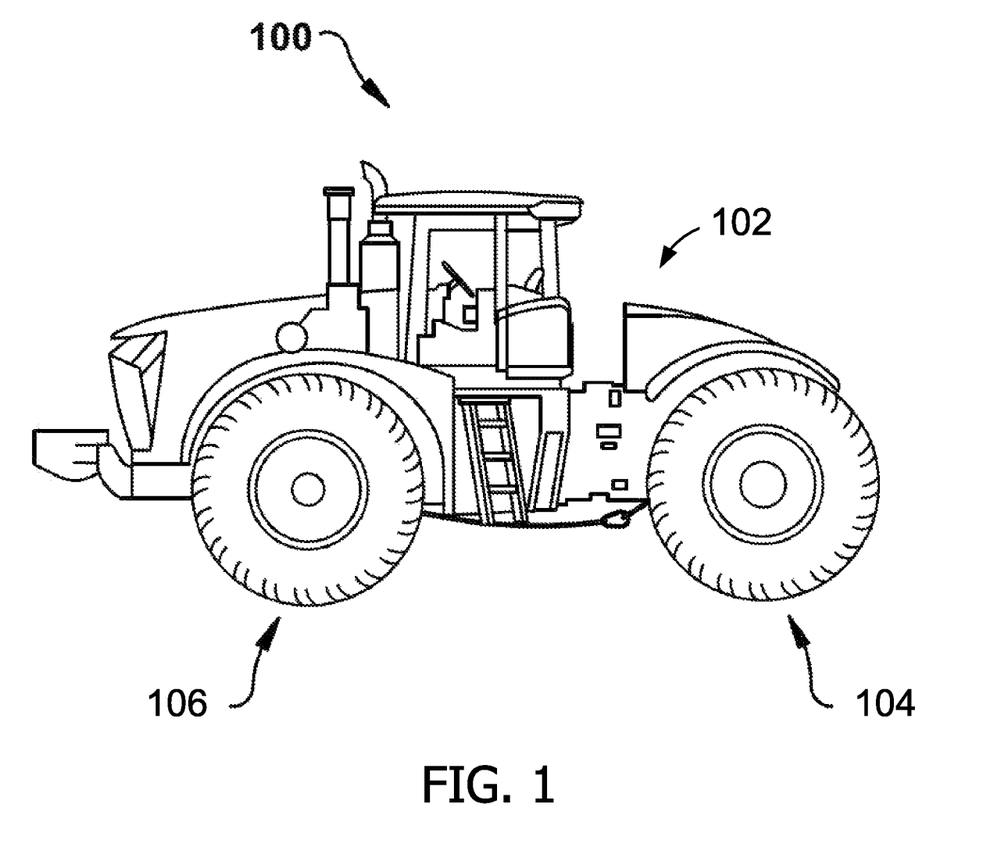
FIG. 1 is a component diagram illustrating an example implementation of a vehicle in which various examples can be implemented.

FIG. 1 is a component diagrams illustrating an example implementation of a system that may utilize one or more portions of the aspects and examples described herein. In the implementation illustrated in FIG. 1, a vehicle 100, such as a tractor, can perform different operations, such as a ground working operation in a field. In some implementations, the vehicle 100 has wheels 104, 106 installed thereon. In other implementations, the vehicle 100 has track systems (not shown) instead of wheels installed on the rear or both the front and rear of the vehicle 100.

The vehicle 100 includes a chassis 102, which provides attachment points for the vehicle 100. For example, a work tool (e.g., a bucket, fork, blade, auger, or hammer) can be connected to the front or back of the chassis 102. The work tool is movably connected to the chassis 102 in some examples.

The vehicle 100 further includes an engine exhaust aftertreatment system as described in more detail herein. For example, the engine exhaust aftertreatment system includes a DEF heater to prevent, dislodge, and/or disintegrate deposit formation at a DEF injector tip of the engine exhaust aftertreatment system.

While various examples are described in connection with a tractor having a particular configuration, the systems and methods described herein may also be utilized with other types of vehicles and implements. For example, the vehicle may comprise another utility-type vehicle, such as a truck, hauler, semi-tractor, or any vehicle that uses an exhaust gas treatment system, such as any vehicle with a diesel-powered internal combustion engine. For example, one or more herein described aspects can be implemented in a work vehicle, such as a backhoe loader, but may be any work vehicle with an exhaust aftertreatment system that includes a DEF injector, such as an articulated dump truck, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader, among others. The various examples can also be implemented in other work vehicles, passenger vehicles, or other equipment powered by a diesel engine (e.g., generators, compressors, pumps, and the like).

Figure 2:
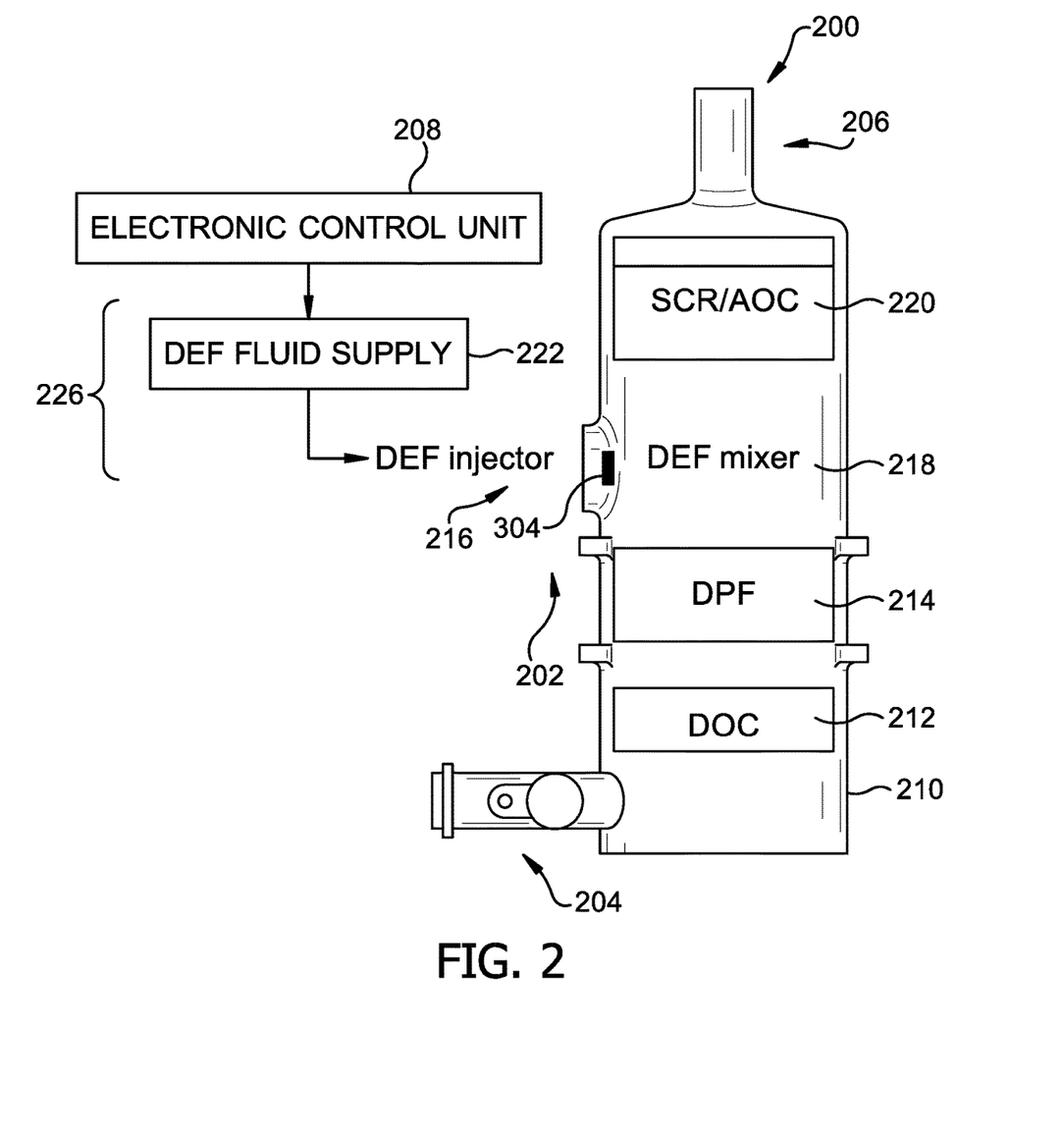
FIG. 2 is a diagram illustrating an exhaust gas aftertreatment system having a DEF injector heater according to one implementation.

The vehicle 100 in one example is a diesel-powered internal combustion engine vehicle that includes an exhaust gas aftertreatment system 200 as illustrated in FIG. 2. The exhaust gas aftertreatment system 200 can be used in any work vehicles, passenger vehicles, or other equipment powered by a diesel engine. The exhaust gas aftertreatment system 200 includes an exhaust pathway 202 (e.g., an exhaust pipe) having an inlet 204 or upstream side that receives untreated exhaust gas and an outlet 206 (e.g., exhaust pipe) or downstream side that expels treated exhaust gas.

In the illustrated example, an electronic control unit (ECU) 208 is configured to control various aspects of the operation of the exhaust gas aftertreatment system 200, such as to control an amount of DEF injected (e.g., sprayed) into the exhaust pathway 202. For example, a sensor (not shown) is communicatively coupled to the ECU 208 to provide feedback to the ECU 208 indicative of the performance of the exhaust gas treatment system 200. In some examples, one or more sensors may be provided to monitor various parameters of the exhaust gas treatment system 200, for example, to monitor NOx concentrations, ammonia concentrations, temperature, exhaust flow rate, and/or ash loading (e.g., monitor ash at the DPF 212) at one or more points along the exhaust pathway 202 and provide feedback to the ECU 208 indicative of the performance of the exhaust gas treatment system 200. In other examples, the exhaust gas treatment system 200 is not actively controlled, and the sensor(s) and/or the ECU 208 can be omitted.

Figure 3:
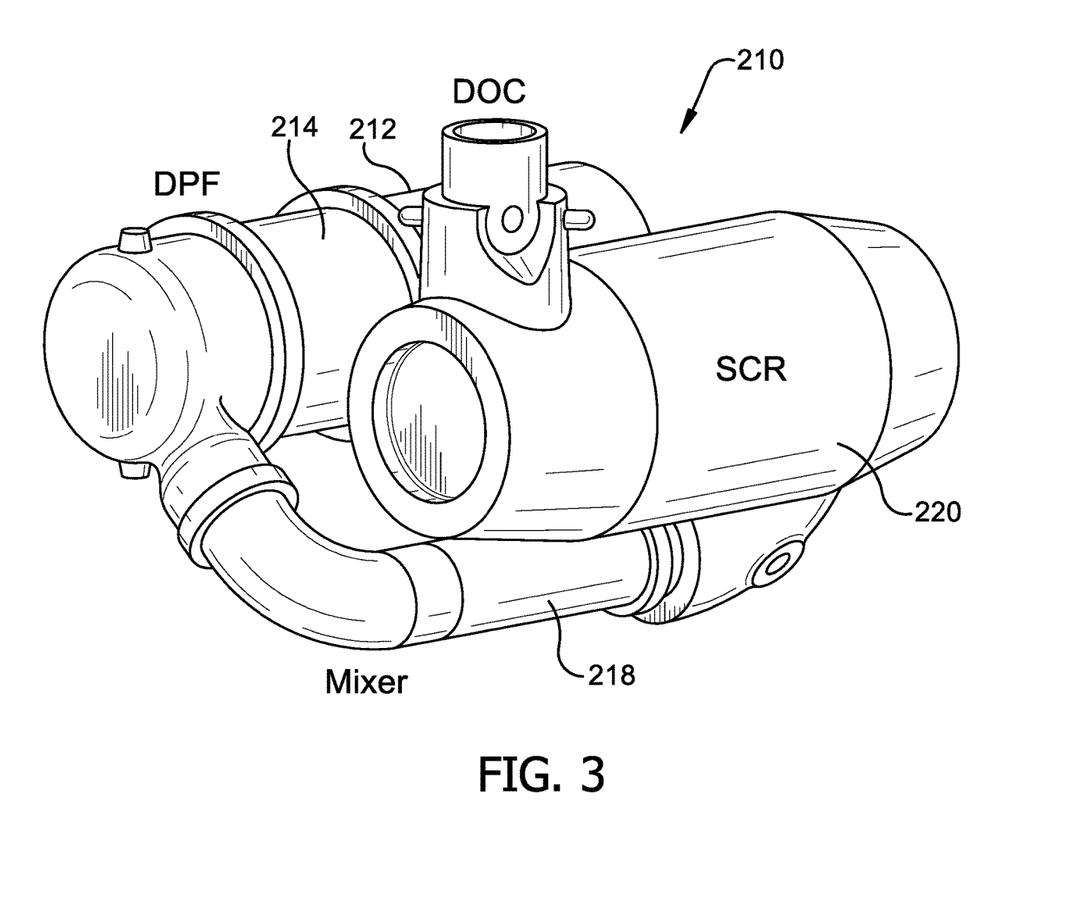
FIG. 3 is a diagram illustrating an exhaust gas aftertreatment system in which heating according to various implementations can be implemented.

The exhaust pathway 202 is formed through an exhaust manifold 210 (as also shown in FIG. 3), which can be formed from one or more pipes and includes a plurality of treatment elements that together define a cylindrical exhaust gas treatment unit in the illustrated example. It should be noted that the configuration of the exhaust manifold 210 can be varied as desired or needed, such as based on the type of vehicle or exhaust system. For example, the size of the pipes, the size of the treatment elements, etc. can be varied.

The illustrated exhaust gas aftertreatment system 200 includes a preliminary treatment element, which is a diesel oxidation catalyst (DOC) element 212 and includes, for example, a honeycomb support coated with a catalytic material, such as a platinum group metal. The DOC element 212 may be used to reduce some particulate matter, carbon monoxide, and hydrocarbons from exhaust passing through the DOC element 212. Alternatively, the DOC element 212 can include a different exhaust treatment configuration. In some examples, the DOC element 212 can be included as a portion of a different treatment element.

A diesel particulate filter (DPF) element 214 is located downstream of the DOC element 212. The DPF element 214 is configured to trap diesel particulate matter and oxidize soot. A DEF injector 216 that forms part of a DEF mixer 218 is located downstream of the DPF element 214. A heater 304 is configured to heat at least a portion of or a portion surrounding the DEF injector 216 as described in more detail herein. In some examples of the exhaust gas aftertreatment system 200, the DPF element 214 can be omitted.

A combined selective catalytic reduction and ammonia oxidizing catalyst (SCR/AOC) element 220 is located downstream of the DEF mixer 218. In operation, the SCR/AOC element 220 is configured to convert the NOx present in exhaust gas into other compounds, such as nitrogen and carbon dioxide. In some examples, the SCR portion of the SCR/AOC element 220 can include, for example, a catalytic washcoat on a monolithic support material, such as ceramic. The SCR portion and the AOC portion are positioned in series, with the AOC portion located downstream of the SCR portion in some examples. The SCR portion of the SCR/AOC element 220 can be used to reduce NOx from exhaust gas passing through the SCR portion. The AOC portion of the SCR/AOC element 220 can be used to convert excess ammonia leaving the SCR portion to nitrogen and water. In some examples, the AOC portion can be omitted. Alternatively, the AOC portion can be provided as a separate treatment element.

In the illustrated example, the DEF is injected upstream of the SCR/AOC element 220 by the DEF injector 216 to provide ammonia, which acts as a reducing agent and reacts with the NOx in the presence of the SCR catalyst. In the illustrated example, a DEF fluid supply 222, such a DEF tank, is configured to store DEF fluid. In various examples, the fluid supply 222 is fluidly connected to the DEF injector 216. The DEF fluid supply 222 can include a variable pump or valve for controlling an amount of DEF provided to the DEF injector 216. As described in more detail herein, the DEF injector 216 includes the DEF heater 304 that is configured as a local heater that generates heat to prevent or remove (e.g., disintegrate) DEF deposit growth at the DEF injector 216 (e.g., buildup of solid DEF material around the site of the DEF injector 216, which can form a cone shaped buildup).

The exhaust pathway 202 in various examples is connected to an internal combustion engine (not illustrated), such as of the vehicle 100, and is configured to direct exhaust gas through the exhaust gas aftertreatment system 200. As such, exhaust gas from the internal combustion engine is directed into the exhaust pathway 202 wherein the DEF injector 216 located downstream of the inlet 204 injects DEF from the DEF fluid supply 222 into the exhaust pathway 202. The amount of DEF to be injected is determined, for example, by a DEF dosing algorithm. Ammonia from the injected DEF and the exhaust gas are mixed in the DEF mixer 218. After mixing, the exhaust gas and ammonia enter the SCR portion (e.g., SCR chamber) of the SCR/AOC element 220. Inside the SCR portion, the ammonia and an SCR bed react with NO in the exhaust gas. NOx is converted based on the amount of ammonia present. Any excess ammonia is treated in the AOC portion of the SCR/AOC element 220 before the exhaust gas is emitted from the exhaust pathway 202 through the outlet 206.

In some examples, the DEF fluid supply 222, the DEF injector 216, and the DEF heater 304 together form a DEF dispensing system 226 that prevents, dislodges, and/or disintegrates deposit growth around and on a DEF injector nozzle of the DEF injector 216. That is, the DEF dispensing system 226 is controllable by the ECU 208 to dispense an amount of DEF into the DEF mixer 218, while heating at least a portion of the DEF injector 216, particularly a nozzle of the DEF injector 216, or an area around the DEF injector 216, as described in more detail below, to prevent, dislodge, and/or disintegrate deposit growth around and/or on the nozzle of the DEF injector 216.

Figure 4:
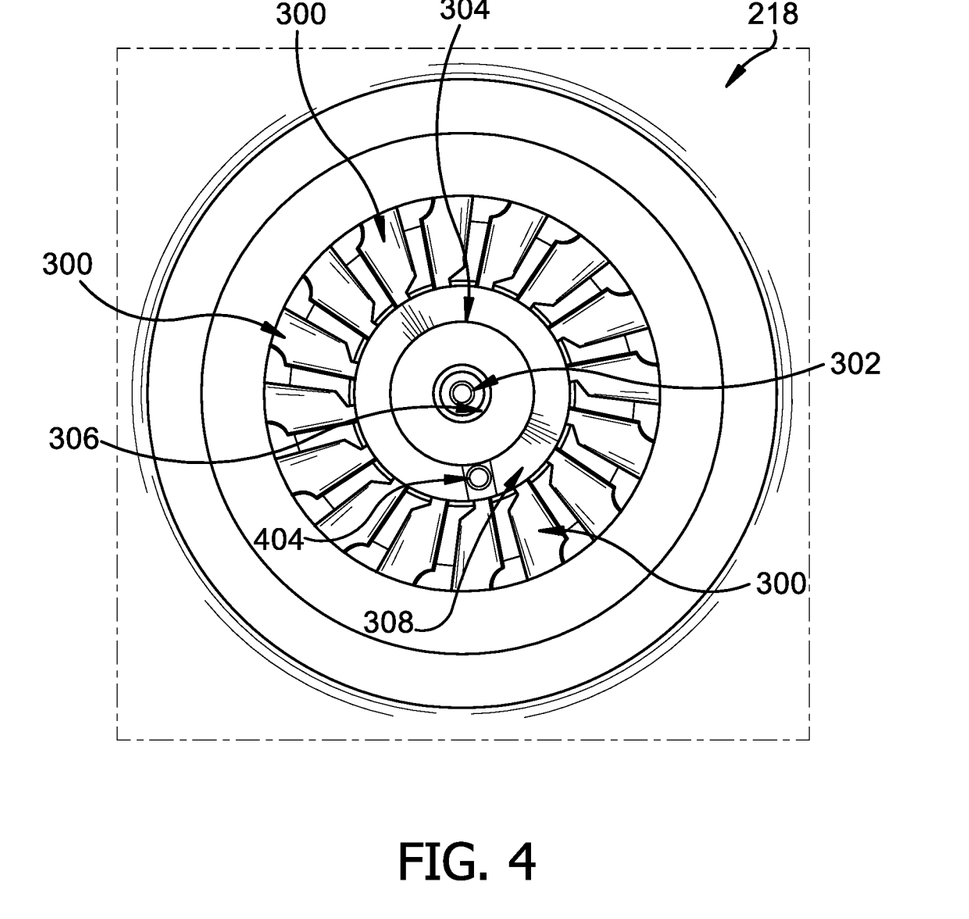
FIG. 4 is a diagram illustrating a DEF injector nozzle having a heater according to one implementation.
Figure 5:
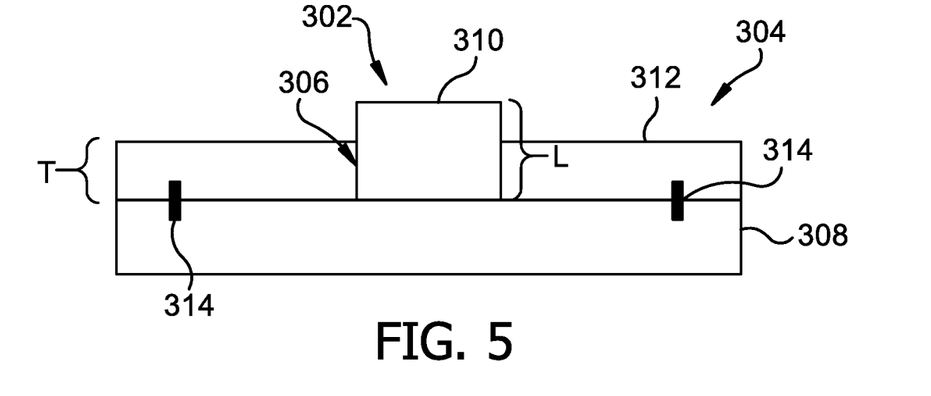
FIG. 5 is a component diagram illustrating a heater arrangement according to one implementation.

Referring to FIGS. 4 and 5, which is an inside view of the DEF mixer 218 looking into the DEF injector 216, and showing a DEF injector nozzle 302, the exhaust gas treatment system 200, in particular the DEF mixer 218, in some examples, includes flow affecting features 300 (e.g., angled blades) into the exhaust pathway 202. It should be noted that the flow affecting features 300 can be, for example, one or more fins, vanes, projections, or other suitable means to impart turbulence or swirling into the exhaust flow proximate the DEF injector 216. It should further be noted that the flow affecting features 300 can be positioned upstream or downstream of the DEF injector 216, as well as in one or more of the pipes.

In one example, the DEF injector nozzle 302 has a portion (e.g., an elongated portion or tip) that extends into the exhaust pathway 202. A plurality of openings (not shown) in the DEF injector nozzle 302 allows ammonia to be expelled from the DEF injector 216 at multiple locations in the exhaust pathway 202. In the illustrated example, the DEF injector 216 includes the DEF heater 304 that surrounds a portion of the DEF injector 216, which in this example is the DEF injector nozzle 302. That is, the DEF heater 304 (illustrated as ring-shaped) extends circumferentially around the DEF injector nozzle 302. The DEF heater 304 in some examples completely surrounds or encircles the entire circumference of the DEF injector nozzle 302. In other examples, the DEF heater 304 surrounds a portion of the DEF injector nozzle 302, thereby not completely encircling the outer circumference of the DEF injector nozzle 302.

A tip 310 of the DEF injector nozzle 302 extends through a central opening 306 of a body 312 of the DEF heater 304. As such, in operation, the DEF heater 304 (particularly the DEF body 312) is configured to generate localized heat in an area proximate to or in the vicinity of the DEF injector nozzle 302. In some examples, the DEF heater 304 generates sufficient heat to heat the DEF injector nozzle 302 and a surface of a flange 308 to which the DEF injector 216 is coupled, such as by fasteners 314 (e.g., screws, bolts, etc.). It should be noted that the arrangement, including the positioning, orientation, and coupling of the DEF heater 304 within the exhaust gas aftertreatment system 200 can be varied as desired or needed. That is, the DEF heater 304 can be coupled to different portions and in different orientations within the exhaust gas aftertreatment system 200, such as at different locations within the DEF mixer 218.

As can be seen in FIG. 5, in one example, the DEF injector nozzle 302 extends through the central opening 306 and beyond an end of the DEF heater 304. That is, a thickness (T) of the DEF heater 304 is less than a length (L) DEF injector nozzle 302 such that the end (e.g., the tip 310) of the DEF injector nozzle 302 having openings (not shown) therein to disperse or expel DEF, is not surrounded by the DEF heater 304. It should be noted that the dimensions and configuration of the DEF heater 304 can be varied as desired or needed. The thickness, width, diameter, shape, etc. of the DEF heater 304 can be varied, such as based on heating requirements, configuration or operating characteristics of the DEF injector nozzle 302, configuration or operating characteristics of the DEF injector 216, etc. For example, the DEF heater 304 can be shaped to be oval, square, rectangular, star-shaped, etc., as well as have a symmetric or asymmetric shape. In some examples, the DEF heater 304 is configured to have a thickness so as to not interfere with the DEF spray, such as having a spray cone angle from the DEF injector nozzle 302 of between about 30-40 degrees. In some examples, the DEF heater 304 is configured to have a thickness that is planar or aligned with a top of the DEF injector nozzle 302 or slightly thicker. That is, in some examples, the DEF heater 304 is as tall or slightly taller than the DEF injector nozzle 302.

In various examples, the DEF heater 304 is an exhaust compatible heater. For example, the DEF heater 304 is formed from one or materials, or a heating element or heater, capable of operating in conditions within the exhaust flow 202, such as to be corrosion resistant (e.g., made of materials that are resistant to corrosion from DEF or other common exhaust species) and crack resistant in such an environment. In one example, the DEF heater 304 is a ceramic type heater, such as a metal heating element (e.g., the body 312 is formed from a steel element) filled with a ceramic material. That is, the ceramic material is surround by a metal material. In some examples, the DEF heater 304 is configured to not cause disturbance of exhaust flow or change the DEF spray pattern.

In operation, in various examples, a local heat source is provided by the DEF heater 304 to eliminate DEF deposit growth (e.g., prevent or disintegrate existing growth) near the tip 310 of the DEF injector nozzle 302. Using the herein disclosed configurations with the DEF heater 304, the DEF mixer 218 can be optimized to achieve maximal ammonia uniformity and SCR conversion efficiency instead of trading off this performance with deposit formation risks. That is, the configurations disclosed herein can interrupt the deposit growth pathway that leads to liquid pooling when DEF spray is deflected by a thermally insulting deposit canopy causing the DEF to drip onto the DPF 212 (in the vertical orientation illustrated in FIG. 1). It should be noted that although one or more examples is described in connection with the DEF heater 304 being configured to be coupled in a vertically mounted engine exhaust aftertreatment system, the examples, including the DEF heater 304, can be implemented in differently configured engine exhaust aftertreatment systems.

Figure 6:
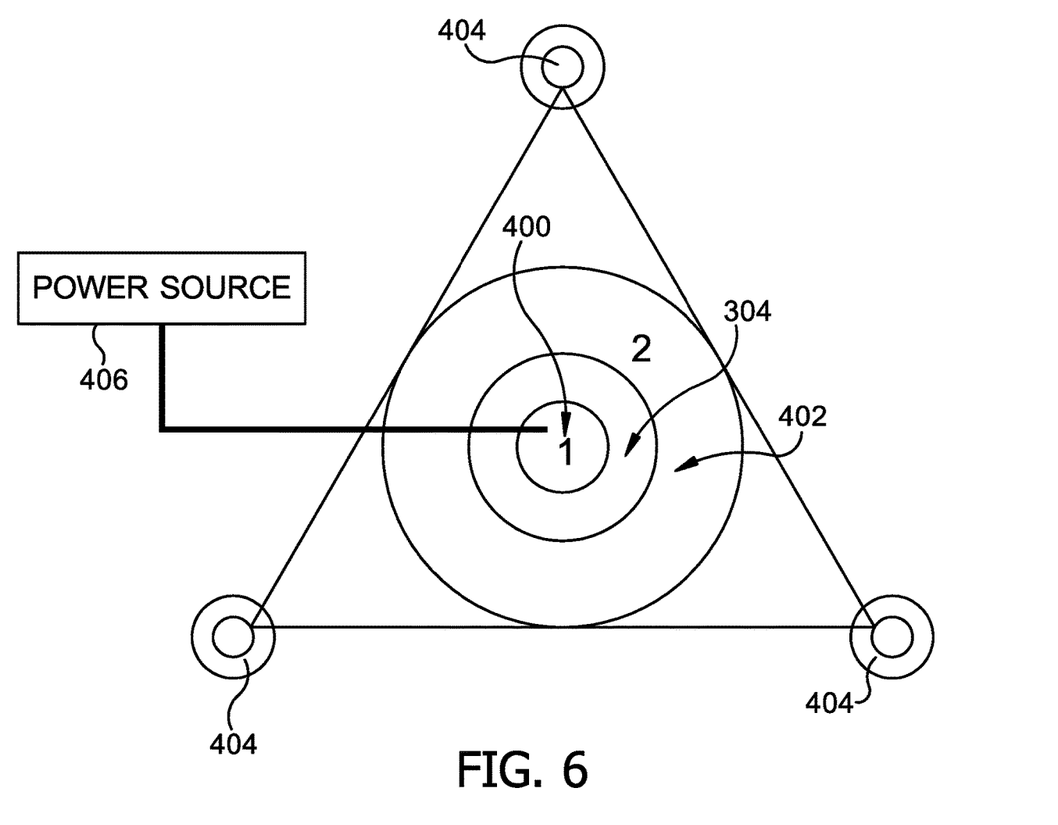
FIG. 6 is another diagram illustrating a heater arrangement according to one implementation.

With reference now to FIG. 6 (and continued reference to FIGS. 4 and 5), the DEF dispensing arrangement can be prone to DEF deposit growth, which starts from the deposit formation on an injector nozzle area 400 around the tip 310 of the DEF injector nozzle 302. Various examples include the DEF heater 304 that is configured to generate localized heat at and/or around the injector nozzle area 400. For example, the DEF heater 304 is configured to generate heat around the tip 310 of the DEF injector nozzle 302 on a urea injector body 402 that is exposed to exhaust. For example, the urea injector body 402 is a portion of the flange 308 that is exposed to exhaust. In some examples, an entirety of the surface of the flange 308 is exposed to exhaust. It should be noted that in the illustrated example, a plurality of mounting bosses 404 are configured to align and mount the DEF injector 216 to the flange 308.

In one example, the DEF heater 304 is a low-profile donut-shaped electrical heater. However, as should be appreciated, other forms and configuration of electrical heaters can be used. The DEF heater 304 can be an electrical heater that consumes a low or minimal amount of energy (e.g., 130 watts (W)) and is configured to be turned on and off periodically. It should be noted that the DEF heater 304 in various examples is not configured or arranged to heat the bulk exhaust gas, but instead provides only a local hot surface that interrupts deposit growth and severs connection thereof with the deposit on the injector nozzle area 400. In some examples, the localized heat from the DEF heater 304 additionally causes any existing deposit to disintegrate and fragments to be carried away by the exhaust flow in the exhaust pathway 202. In other words, the DEF heater 304 provides a local hot spot to vaporize a section of deposit to loosen up an anchor of the deposit to the injector nozzle area 400, such as to the tip 310 of the DEF injector nozzle 302.

A power source 406 is coupled to the DEF heater 304. For example, the power source 406 is a power source sufficient to cause the DEF heater 304 to generate heat for the local hot spot. In one example, the power source 406 is provided by an existing twelve volt (12V) and/or twenty-four volt (24V) electrical system within the vehicle 100. Table 1 illustrates one example of the power characteristics of the DEF heater 304.

TABLE 1

| | | |
|---|---|---|
| H2O | 10 | g |
| urea | 10 | g |
| water evaporation | 2626 | J/g |
| water vapor heat capacity | 2 | J/g |
| urea heat capacity | 6.68 | J/mole/C. |
| 1 mole of urea | 60.6 | g/mole |
| urea solid heat capacity | 0.11 | J/g/C. |
| temp rise | 600 | C. |
| heat time | 5 | min |
| water evaporation | 26260 | J |
| heat water vapor | 12000 | J |
| heat for urea | 661.4 | J |
| Total heat | 38921.4 | J |
| Total heat | 38.9 | kJ |
| Total heat | 0.011 | kWh |
| Total Power | 0.1 | kW |
| Total Power | 130 | w |

It should be noted that the values in Table 1 are for power consumption of raising deposit temperature assuming the deposit is 50% water and 50% urea. It should be noted that in various examples, the power consumption for the DEF heater 304 is in the range of 100 W-500 W range. However, other power ranges are contemplated, such as based on the heating requirements for the particular system.

Figure 7:
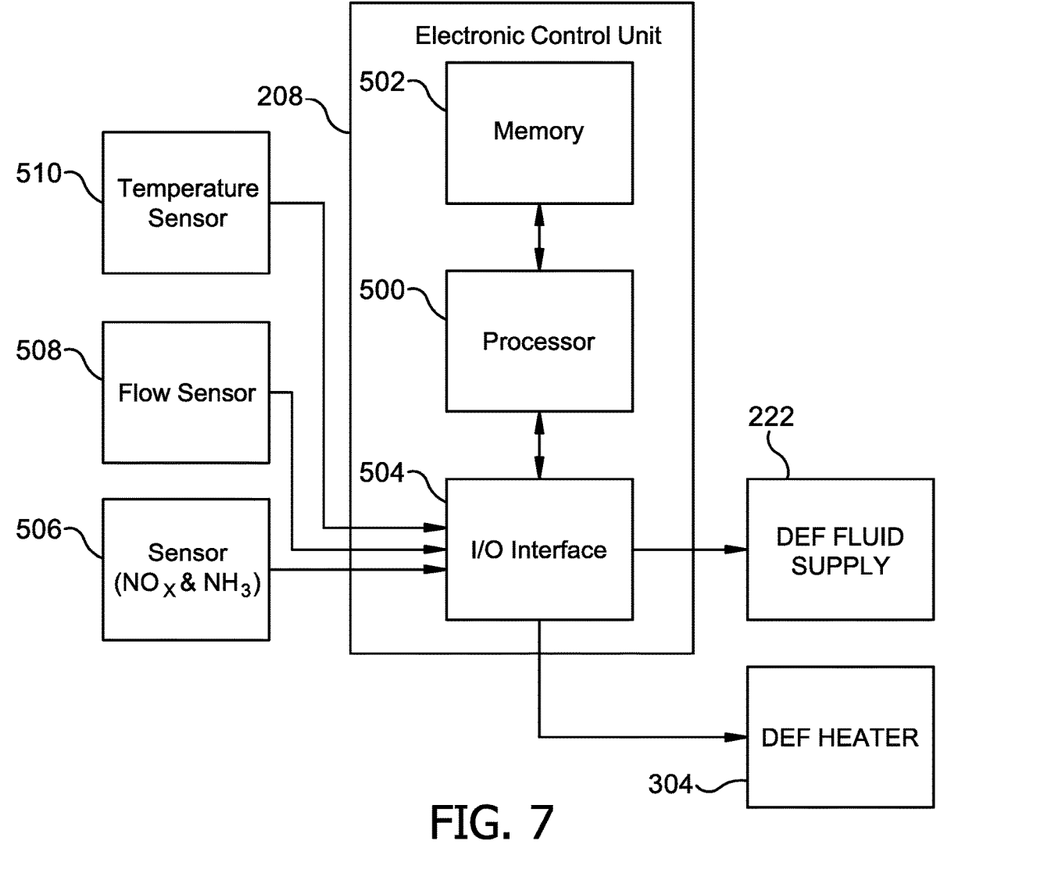
FIG. 7 is a block diagram of an electronic control unit usable with the exhaust gas aftertreatment system of FIG. 2.

FIG. 7 illustrates an example of the ECU 208 for controlling the exhaust gas aftertreatment system 200. The ECU 208 includes a plurality of electrical and electronic components that provide power, operational control, and protection to the components and modules within the ECU 208. In particular, the ECU 208 includes, among other things, an electronic processor 500 (e.g., a programmable microprocessor, microcontroller, or similar device), non-transitory, machine-readable memory 502, and an input/output interface 504. The electronic processor 500 is communicatively coupled to the memory 502. The electronic processor 500 is configured to retrieve from the memory 502 and execute, among other things, instructions related to the control processes and methods described herein, such as to control the heating by the DEF heater 304. In some examples, the ECU 208 includes additional, fewer, or different components. The ECU 208 may also be configured to communicate with external systems including, for example, engine controls and/or operator controls.

The ECU 208 in the illustrated example is communicatively coupled to a sensor 506 (for sensing NOx and ammonia), other sensors, such as a flow sensor 508, and a temperature sensor 510, the DEF fluid supply 222, and the DEF heater 304. The ECU 208 in some examples receives a signal input from the sensor 506 indicative of the amount of NOx and ammonia present in the exhaust gas. When the sensors 508 and 510 are present, the ECU 208 is also configured to adjust control of the DEF fluid supply 222 depending on the temperature of the exhaust gas and the flow rate of the exhaust gas. The input/output interface 504 facilitates communication between the ECU 208 and the DEF fluid supply 222. Through the input/output interface 504, the ECU 208 is configured to set the output of the DEF fluid supply 222 to obtain a desired dosing of DEF. The input/output interface 504 also coordinates input communications to the ECU 208 from the sensors 506, 508, and 510.

The input/output interface 504 also facilitates communication between the ECU 208 and the DEF heater 304. Through the input/output interface 504, the ECU 208 is configured to control the operation (e.g., turning on and off) of the DEF heater 304 to obtain a desired local heating at the tip 310 of the DEF injector nozzle 302.

It should be noted that the memory 502 in some examples includes any computer-readable media. In one example, the memory 502 is used to store and access instructions configured to carry out the various operations disclosed herein. In some examples, the memory 602 includes computer storage media in the form of volatile and/or nonvolatile memory, removable or non-removable memory, data disks in virtual environments, or a combination thereof. In one example, the processor(s) 500 includes any quantity of processing units that read data from various entities, such as the memory 502. Specifically, the processor(s) 500 are programmed to execute computer-executable instructions for implementing aspects of the disclosure. In one example, the instructions are performed by the processor(s) 500 and the processor 500 is programmed to execute instructions such as those illustrated in the flowcharts discussed herein and depicted in the accompanying drawings.

It should also be noted that computer readable media comprises computer storage media and communication media. Computer storage media include volatile and non-volatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

Thus, the ECU 208 is configured to control the exhaust gas aftertreatment system 200, among other systems. For example, the ECU 208 in some examples is operable to control the DEF heater 304 as illustrated in the flowchart 600 of FIG. 8. That is, the flowchart 600 illustrates operations involved in controlling heating at a DEF nozzle according to one implementation. In some examples, the operations of the flowchart 600 are performed using the DEF injector 216 in combination with the other components of the exhaust gas aftertreatment system 200 described herein. The flowchart 600 commences with operation 602, which includes configuring a heater for a DEF nozzle. For example, a heating element (e.g., the DEF heater 304) is configured to be arranged in proximity (e.g., abutting) to a DEF injector, such as the DEF injector 216. In some examples, the DEF heater 304 is configured to be positioned around the DEF injector nozzle 302 to allow for localized heating in the immediate or adjacent area surrounding (e.g., encircling) the DEF injector nozzle 302. That is, the DEF heater 304 is configured to generate enough heat to prevent, dislodge, and/or disintegrate any deposit growth around and on the DEF injector nozzle 302. In some examples, the DEF heater 304 is a low cost, local heater with low energy requirements. As such, the DEF heater 304 is not an area heater (e.g., a 30 kW heater) that is too large to fit in the space surrounding the DEF injector nozzle 302 and could have adverse effects on the exhaust gas aftertreatment system 200.

Figure 8:
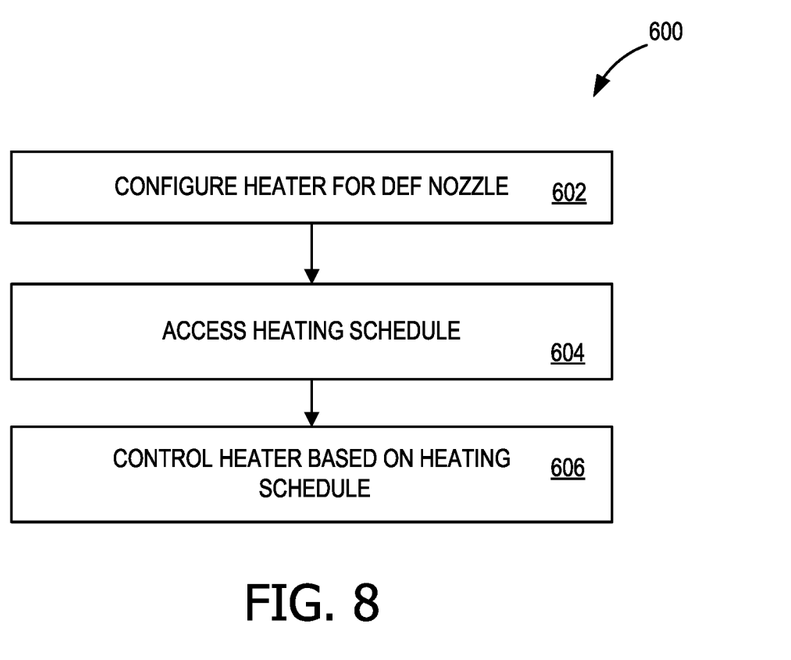
FIG. 8 illustrates an example implementation of a method for controlling heating at a DEF nozzle.

In some examples, configuring the heater includes configuring the heating properties of the heater, as well as the configuration of the heater to allow for mounting in proximity to the DEF nozzle. That is, the heating properties of the heater are configured, or the heater is selected, to be able perform heating to prevent, dislodge, and/or disintegrate any deposit growth around and on the DEF injector nozzle 302, as well as to have physical properties to allow mounting or arranging the heater to allow for localized heating in the area of the DEF injector nozzle 302.

At operation 604, a heating schedule is accessed. For example, based on the type of heater, type of vehicle, type of exhaust, type of the exhaust gas aftertreatment system 200, heating requirements, etc., heating requirements are accessed. In some examples, one or more heating schedules are stored within a memory and correspond to the different configurations or arrangements. The heating schedules in various examples include information relating to performing heating using the configured heater, such as when to turn on the heater, how long to maintain the heater on, how long to maintain the heater off, etc.

As should be appreciated, the heating schedule can include any information that facilitates operating the heater to prevent, dislodge, and/or disintegrate any deposit growth around and on the DEF injector nozzle 302. In some examples, a table of operating properties or characteristics are set or defined (e.g., control values) based on the type of heater, type of vehicle, type of exhaust, type of the exhaust gas aftertreatment system 200, heating requirements, etc. As such, a plurality of tables can be stored that define different operating properties or characteristics based on the different parameters. In some examples, for the same vehicle, different heating schedules can be provided based on whether the operation of the heater is at engine startup, engine idle, etc. That is, the operating states of the vehicle can have different heating schedules. In some examples, the heating schedule can be based on an amount of deposit growth that is expected or has occurred. For example, how often the heater is turned on can be based on a growth rate of the deposit in some examples, which can be empirically determined, determined by simulation, etc. Thus, as should be appreciated, the heating schedule can be based on many different factors or criteria (e.g., also based on time of day, time of year, etc.).

With the heater assembled and coupled in proximity to the DEF nozzle, and the heating schedule selected, the heater is controlled at operation 606 based on the accessed heating schedule. For example, the timing and level of heat (based on an applied power level) from the heating schedule are used to control the operation of the heater. As an example, the heater is turned on for five minutes every twenty hours, or every fifty hours, or every 100 hours, etc. In other examples, the heater is turned on for ten minutes or some other time period based on the heating schedule. Other heating timings are also contemplated. It should be appreciated that the various settings within a heating schedule define operating parameters that are periodic in some examples. However, in other examples, the operating parameters are aperiodic, such having different time on periods, different time gaps between turning on the heater, etc. The heater in some examples is controlled based on one or more control signals (e.g., digital on/off signals or other ECU commands) communicated to the heater by a controller (e.g., the ECU 208). In some examples, the controller is programmed with the settings from one or more of the heating schedules to control the operation of the heater. It should be appreciated that in some examples, feedback is provided to ensure proper heat application, prevent overheating, etc.

Thus, localized heating at a DEF nozzle (e.g., the DEF injector nozzle 302) prevents, dislodges, and/or disintegrates deposit growth on and around the DEF nozzle. For example, the controlled operation of the DEF heater 304 prevents a large deposit to grow, which could affect the operation of the DEF nozzle and delivery of the DEF to the system (e.g., have a negative system performance impact), including restricting the flow of DEF out of the DEF nozzle. As such, in various examples, active management control of deposit growth is provided.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A diesel exhaust fluid (DEF) dispensing system, the DEF dispensing system comprising:
    a DEF fluid supply;
    a DEF injector fluidly coupled to the DEF fluid supply, the DEF injector comprising a DEF injector nozzle;
    a flange within a DEF mixer; and
    a DEF heater positioned in proximity to the DEF injector nozzle, the DEF injector and the DEF heater coupled to a surface of the flange, the DEF heater configured to locally heat an area surrounding the DEF injector nozzle and generate sufficient heat to heat the DEF injector nozzle and the surface of the flange.

2. The DEF dispensing system of claim 1, wherein the DEF heater is ring-shaped and surrounds a circumference of the DEF injector nozzle.

3. The DEF dispensing system of claim 2, wherein the DEF heater comprises a central opening and the DEF injector nozzle extends through the central opening with a tip of the DEF injector nozzle extending beyond an end of the DEF heater.

4. The DEF dispensing system of claim 2, wherein the DEF heater entirely surrounds the circumference of the DEF injector nozzle and is in abutting contact with the DEF injector nozzle and the flange.

5. The DEF dispensing system of claim 1, further comprising the DEF mixer having an opening through which the DEF injector is positioned, wherein the DEF heater is in direct contact with the surface of the flange to heat the surface.

6. The DEF dispensing system of claim 1, further comprising an electronic control unit (ECU) coupled to the DEF fluid supply and the DEF heater, the ECU configured to transmit control signals to (i) the DEF fluid supply to control an amount of DEF dispensed by the DEF fluid supply and (ii) the DEF heater to control heating by the DEF heater based on a heating schedule, wherein the heating schedule comprises information relating to performing heating using the DEF heater, including when to turn on the DEF heater, how long to maintain the DEF heater on, and how long to maintain the DEF heater off, and further comprises a table of operating properties or characteristics based on a type of the DEF heater, a type of vehicle, a type of exhaust, a type of the exhaust gas aftertreatment system, and one or more heating requirements.

7. The DEF dispensing system of claim 6, wherein the heating schedule comprises control values utilized by the ECU to control the DEF heater to at least one of prevent, dislodge, or disintegrate deposit growth around the DEF injector nozzle.

8. The DEF dispensing system of claim 1, wherein the DEF heater is operable in a power consumption range of between 100 W and 500 W.

9. The DEF dispensing system of claim 1, wherein the DEF heater is operable between 12 V and 24 V supplied by a power source of an electrical system within a vehicle.

10. A diesel exhaust fluid (DEF) heater, comprising:
   a body configured to couple to a surface of a flange of a DEF mixer; and
   a central opening extending through the body, the central opening configured to receive therein a DEF injector nozzle of a DEF injector,
   wherein the body is configured to generate sufficient heat to heat the DEF injector nozzle and the surface of the flange to at least one of prevent, dislodge, or disintegrate deposit growth around the DEF injector nozzle.

11. The DEF heater of claim 10, wherein the body is ring-shaped and configured to surround a circumference of the DEF injector nozzle.

12. The DEF heater of claim 10, wherein the body is configured to entirely surround a circumference of the DEF injector nozzle.

13. The DEF heater of claim 10, wherein the DEF heater is operable in a power consumption range of between 100 W and 500 W.

14. The DEF heater of claim 10, wherein the DEF heater is operable between 12 V and 24 V supplied by a power source of an electrical system within a vehicle.

15. A method for controlling heating at a diesel exhaust fluid (DEF) injector nozzle, the method comprising:
   configuring a DEF heater to generate heat at the DEF injector nozzle, wherein the DEF heater is coupled to a surface of a flange within a DEF mixer;
   accessing a heating schedule, the heating schedule stored in a memory; and
   controlling the DEF heater to generate heat based on the accessed heating schedule, the heat being of a sufficient temperature to heat the DEF injector nozzle and the surface of the flange and to at least one of prevent, dislodge, or disintegrate deposit growth around the DEF injector nozzle.

16. The method of claim 15, further comprising configuring the DEF heater to directly couple to the flange within the DEF mixer.

17. The method of claim 15, further comprising configuring the DEF heater to have an opening therethrough to receive the DEF injector nozzle.

18. The method of claim 15, further comprising configuring the DEF heater to be ring-shaped to surround a circumference of the DEF injector nozzle.

19. The method of claim 18, wherein the DEF heater is configured to entirely surround the circumference of the DEF injector nozzle.

20. The method of claim 15, further comprising configuring the DEF heater to be operable in a power consumption range of between 100 W and 500 W.

* * * * *